United States Patent

Nakagawa et al.

[11] Patent Number: 6,086,848
[45] Date of Patent: *Jul. 11, 2000

[54] PROCESS FOR PREPARING ZEOLITES USING SUBSTITUTED-PIPERIDINIUM CATIONS

[75] Inventors: Yumi Nakagawa, Oakland; Gregory S. Lee, San Ramon; Stacey I. Zones, San Francisco, all of Calif.

[73] Assignee: Chevron U.S.A. Inc., San Francisco, Calif.

[*] Notice: This patent is subject to a terminal disclaimer.

[21] Appl. No.: 08/992,053

[22] Filed: Dec. 17, 1997

Related U.S. Application Data

[60] Continuation-in-part of application No. 08/703,556, Aug. 27, 1996, Pat. No. 5,683,572, which is a division of application No. 08/566,201, Dec. 1, 1995, Pat. No. 5,580,540
[60] Provisional application No. 60/034,459, Dec. 31, 1996.

[51] Int. Cl.[7] .................................................. C01B 39/48
[52] U.S. Cl. ........................... 423/706; 423/713; 423/718
[58] Field of Search .................................... 423/706, 709, 423/713, 718

[56] References Cited

U.S. PATENT DOCUMENTS

| | | | |
|---|---|---|---|
| 4,366,135 | 12/1982 | Le Van Mao et al. | 423/706 |
| 4,391,785 | 7/1983 | Rosinski et al. | 423/706 |
| 4,525,466 | 6/1985 | Moretti et al. | 423/707 |
| 4,539,193 | 9/1985 | Valyocsik | 423/708 |
| 4,568,654 | 2/1986 | Valyocsik | 502/62 |
| 5,106,801 | 4/1992 | Zones et al. | 423/718 |
| 5,187,132 | 2/1993 | Zones et al. | 502/64 |
| 5,453,511 | 9/1995 | Saxton | 423/706 |
| 5,580,540 | 12/1996 | Nakagawa | 423/718 |
| 5,591,421 | 1/1997 | Zones | 423/706 |

FOREIGN PATENT DOCUMENTS

| | | |
|---|---|---|
| 012473 | 6/1980 | European Pat. Off. . |
| 021445 | 7/1981 | European Pat. Off. . |
| 2573326 | 5/1986 | France . |
| WO95/09812 | 4/1995 | WIPO . |
| WO96/34827 | 7/1996 | WIPO . |
| WO96/29284 | 9/1996 | WIPO . |

OTHER PUBLICATIONS

Meier et al., "Atlas of Zeolite Structure Types," Third Edition, pp. 58–59, 1992 No Month Available.

*Primary Examiner*—Elizabeth Wood
*Assistant Examiner*—David Sample
*Attorney, Agent, or Firm*—A. Stephen Zavell; W. Keith Turner; Richard J. Sheridan

[57] ABSTRACT

The present invention relates to a process for preparing zeolites having 12-ring pores and having at least one internal pore structure with a cross section measuring greater than 7.5 Å using substituted-piperidinium cations as organic templates.

16 Claims, No Drawings

PROCESS FOR PREPARING ZEOLITES USING SUBSTITUTED-PIPERIDINIUM CATIONS

This application claims priority from U.S. provisional application Serial No. 60/034,459, filed Dec. 31, 1996 and is a continuation-in-part of application Ser. No. 08/703,556, filed Aug. 27, 1996, now U.S. Pat. No. 5,683,572, which is a division of Ser. No. 08/566,201, filed Dec. 1, 1995 now U.S. Pat. No. 5,580,540.

BACKGROUND OF THE INVENTION

1. Field of the Invention

The present invention relates to a process for preparing zeolites using substituted-piperidinium cations as an organic template.

2. State of the Art

It has now been found that zeolites containing 12-ring pore structure and having at least one internal pore structure with a cross section measuring greater than 7.5 Å can be prepared using substituted-piperidinium cations as organic templates.

SUMMARY OF THE INVENTION

In accordance with the present invention, there is provided a process for preparing zeolites having 12-ring pores and having at least one internal pore structure with a cross section measuring greater than 7.5 Å, the process comprising:

(a) preparing an aqueous solution from (1) sources of an alkali metal oxide, alkaline earth metal oxide or mixtures thereof; (2) sources of an oxide of a first tetravalent element or mixture of tetravalent elements; (3) sources of an oxide of a second tetravalent element different from the first tetravalent element(s), trivalent element, pentavalent element or mixture thereof; and (4) at least one organic templating agent comprising a substituted-piperidinium cation; and (b) maintaining the aqueous solution under conditions sufficient to form crystals of the zeolite.

The present invention also provides this process further comprising replacing alkali and/or alkaline earth metal cations of the recovered zeolite, at least in part, by ion exchange with a cation or mixture of cations selected from the group consisting of hydrogen and hydrogen precursors, rare earth metals, and metals from Groups IIA, IIIA, IVA, IB, IIB, IIIB, IVB, VIB, and VIII of the Periodic Table of Elements.

The present invention also provides a zeolite having 12-ring pores and having at least one internal pore structure with a cross section measuring greater than 7.5 Å, as-synthesized and in the anhydrous state, whose general composition, in terms of mole ratios, is as follows:

| | |
|---|---|
| $YO_2/W_cO_d$ | >15 |
| $M_{2/n}/YO_2$ | 0.01–0.03 |
| $Q/YO_2$ | 0.01–0.04 | wherein Y is silicon, germanium or a mixture thereof; W is aluminum, gallium, iron, boron, titanium, indium, vanadium or mixtures thereof; c is 1 or 2; d is 2 when c is 1 (i.e., W is tetravalent) or d is 3 or 5 when c is 2 (i.e., d is 3 when W is trivalent or 5 when W is pentavalent); M is an alkali metal cation, alkaline earth metal cation or mixtures thereof; n is the valence of M (i.e., 1 or 2); and Q is at least one substituted-piperidinium cation.

DETAILED DESCRIPTION OF PREFERRED EMBODIMENTS

The present invention comprises:

(a) preparing an aqueous solution from sources of oxides capable of forming the zeolites of this invention and at least one substituted-piperidinium cation;

(b) maintaining the aqueous solution under conditions sufficient to form crystals of the zeolite; and (c) recovering the crystals of the zeolite, As used herein, the term "12-ring pores" refers to zeolites which have 12-ring openings in their framework structure. Examples of such 12-ring zeolites include those designated SSZ-25, SSZ-31, SSZ-33, SSZ-35 and SSZ-43.

The 12-ring zeolites of this invention also have at least one internal pore structure with a cross section measuring greater than 7.5 Å. This measurement includes measuring the pore size at the intersection of pore channels.

The process of the present invention comprises forming a reaction mixture from sources of alkali and/or alkaline earth metal (M) cations with valences n (i.e., 1 or 2); sources of an oxide of a first tetravalent element or mixture of tetravalent elements such as silicon, germanium or mixtures thereof (Y); sources of an oxide of a second tetravalent element different from the first tetravalent element(s), trivalent element, pentavalent element or mixture thereof such as aluminum, gallium, iron, boron, titanium, indium, vanadium or mixtures thereof (W); at least one substituted-piperidinium cation (Q); and water, said reaction mixture having a composition in terms of mole ratios within the following ranges:

TABLE A

| Reactants | General | Preferred |
|---|---|---|
| $YO_2/W_aO_b$ | 10–∞ | 20 or greater |
| $OH^-/YO_2$ | 0.10–1.0 | 0.05–0.50 |
| $Q/YO_2$ | 0.05–0.50 | 0.05–0.40 |
| $M_{2/n}/YO_2$ | 0.05–0.50 | 0.05–0.40 |
| $H_2O/YO_2$ | 15–300 | 20–60 | where Y, W, Q, M and n are as defined above, and a is 1 or 2, and b is 2 when a is 1 (i.e., W is tetravalent) and b is 3 when a is 2 (i.e., W is trivalent).

The substituted-piperidinium cations useful as the organic templates in preparing the zeolites of this invention are those which are capable of forming the zeolites of this invention and have two lower alkyl groups or a spiro ring bonded to the ring nitrogen and at least one lower alkyl group bonded to at least one of the carbon atoms of the piperidine ring. The substituted-piperidinium cations of this invention have the following general formula:

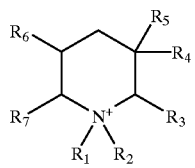

where $R_1$ and $R_2$ are each lower alkyl or together with the nitrogen atom form a five or six member spiro ring (i.e., a spiro ring containing four or five carbon atoms and the nitrogen atom) which may be substituted with at least one lower alkyl group, $R_3$, $R_4$, $R_5$, $R_6$ and $R_7$ are each independently lower alkyl or hydrogen with the proviso that at least one is lower alkyl. As used herein, the term "lower alkyl" means methyl or ethyl.

The anion ($X^-$) associated with the cation may be any anion which is not detrimental to the formation of the zeolite. Representative anions include halogen, e.g., fluoride, chloride, bromide and iodide, hydroxide, acetate, sulfate, tetrafluoroborate, carboxylate, and the like. Hydroxide is the most preferred anion.

Typical sources of aluminum oxide for the reaction mixture include aluminates, alumina, hydrated aluminum hydroxides, and aluminum compounds such as $AlCl_3$ and $Al_2(SO_4)_3$. Typical sources of silicon oxide include silica hydrogel, silicic acid, colloidal silica, tetraalkyl orthosilicates, silica hydroxides, and fumed silicas. Gallium, iron, boron, titanium, indium, vanadium and germanium can be added in forms corresponding to their aluminum and silicon counterparts. Trivalent elements stabilized on silica colloids are also useful reagents.

In preparing the zeolites in accordance with the present invention, the reactants and the substituted-piperidinium cation are dissolved in water and the resulting reaction mixture is maintained at an elevated temperature until crystals are formed. The temperatures during the hydrothermal crystallization step are typically maintained from about 100° C. to about 250° C., preferably from about 140° C. to about 200° C. The crystallization period is generally from about 2 days to about 15 days, typically about 4 days. Preferably the crystallization period is from about 2 days to about 7 days.

The hydrothermal crystallization is usually conducted under pressure and usually in an autoclave so that the reaction mixture is subject to autogenous pressure. The reaction mixture should be stirred during crystallization.

Once the crystals have formed, the solid product is separated from the reaction mixture by standard mechanical separation techniques, such as filtration. The crystals are water-washed and then dried, e.g., at 90° C. to 150° C. for from 8 to 24 hours, to obtain the as-synthesized zeolite crystals. The drying step can be performed at atmospheric or subatmospheric pressures.

During the hydrothermal crystallization step, the crystals can be allowed to nucleate spontaneously from the reaction mixture. The reaction mixture can also be seeded with crystals of the desired zeolite both to direct, and accelerate the crystallization, as well as to minimize the formation of any undesired crystalline phases. When seed crystals are used, typically about 0.5% to about 5.0% by weight (based on the weight of silica used in the reaction mixture) of the seed crystals are added.

Due to the unpredictability of the factors which control nucleation and crystallization in the art of crystalline oxide synthesis, not every combination of reagents, reactant ratios, and reaction conditions will result in crystalline products. Selecting crystallization conditions which are effective for producing crystals may require routine modifications to the reaction mixture or to the reaction conditions, such as temperature, and/or crystallization time. Making these modifications are well within the capabilities of one skilled in the art.

The zeolite product made by the process of this invention has an as-synthesized composition comprising, in terms of mole ratios in the anhydrous state, the following:

| | |
|---|---|
| $YO_2/W_cO_d$ | >15 |
| $M_{2/n}/YO_2$ | 0.01–0.03 |
| $Q/YO_2$ | 0.01–0.04 | where Y, W, c, d, M, n and Q are as defined above. Preferably, Y is silicon, W is aluminum or boron, and M is sodium.

Typically, the zeolite is thermally treated (calcined) prior to use as a catalyst. Usually, it is desirable to remove the alkali metal cation by ion exchange and replace it with hydrogen, ammonium, or any desired metal ion. The zeolite can be leached with chelating agents, e.g., EDTA or dilute acid solutions, to increase the silica/alumina mole ratio. The zeolite can also be steamed; steaming helps stabilize the crystalline lattice to attack from acids. The zeolite can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include hydrogen and hydrogen precursors, rare earth metals, and metals from Groups IIA, IIIA, IVA, IB, IIB, IIIB, IVB, VIB, and VIII of the Periodic Table of Elements. Of the replacing cations, hydrogen and cations of metals such as rare earth, Mn, Ca, Mg, Zn, Cd, Pt, Pd, Ni, Co, Ti, Al, Sn, Ga, In and Fe are particularly preferred.

The zeolite products were identified by their X-ray diffraction (XRD) pattern. The X-ray powder diffraction patterns were determined by standard techniques. The radiation was the K-alpha/doublet of copper. The peak heights I and the positions, as a function of 2θ (2 Theta) where θ is the Bragg angle, were read from the relative intensities, $100 \times I/I_0$ where $I_0$ is the intensity of the strongest line or peak, and d, the interplanar spacing in Angstroms corresponding to the recorded lines, can be calculated.

Minor variations in the diffraction pattern can result from variations in the silica-to-alumina mole ratio of the particular sample due to changes in lattice constants. In addition, sufficiently small crystals will affect the shape and intensity of peaks, leading to significant peak broadening. The variation in the scattering angle (two theta) measurements, due to instrument error and to differences between individual samples, is estimated at +/−0.15–0.30 degrees.

Calcination can also result in changes in the intensities of the peaks as well as minor shifts in the diffraction pattern. The zeolite produced by exchanging the metal or other cations present in the zeolite with various other cations (such as H+ or NH4+) yields essentially the same diffraction pattern, although again, there may be minor shifts in the interplanar spacing and variations in the relative intensities of the peaks. Notwithstanding these minor perturbations, the basic crystal lattice remains unchanged by these treatments.

Examples of zeolites having 12-ring pores and having at least one internal pore structure with a cross section measuring greater than 7.5 Å include, but are not limited to, the zeolites designated SSZ-25, SSZ-31, SSZ-33, SSZ-35 and SSZ-43. These zeolites are identified below.

SSZ-25

Zeolite SSZ-25 is described in U.S. Pat. No. 5,202,014, issued Apr. 13, 1993 to Zones et al., which is incorporated by reference herein in its entirety. It is a zeolite having a mole ratio of an oxide selected from the group consisting of silicon oxide, germanium oxide and mixtures thereof to an oxide selected from the group consisting of aluminum oxide, gallium oxide, iron oxide, boron oxide, and mixtures thereof greater than about 20:1. SSZ-25, after calcination, has the X-ray diffraction (XRD) lines shown in the table below. It preferably has equilibrium sorption capacities of greater than about 10 wt. % for n-hexane.

TABLE I

Calcined SSZ-25 XRD

| $2\theta^{(a)}$ | d | $I/I_2 \times 100$ |
|---|---|---|
| 3.4 | 25.5 | W |
| 7.19 | 12.30 | VS |
| 8.04 | 11.00 | S |
| 10.06 | 8.78 | VS |
| 14.35 | 6.17 | M-S |
| 16.06 | 5.51 | W |
| 22.77 | 3.90 | M |
| 23.80 | 3.74 | W |
| 26.08 | 3.42 | VS |

$^{(a)}\pm 0.20$

SSZ-25 is prepared from a reaction mixture having the composition shown below.

| | Reaction Mixture | |
|---|---|---|
| | Typical | Preferred |
| $YO_2/W_aO_b$ | 20–200 | 30–100 |
| OH—/$YO_2$ | 0.10–1.0 | 0.20–0.40 |
| Q/$YO_2$ | 0.15–0.50 | 0.15–0.30 |
| $M_{2/n}/YO_2$ | 0.05–0.30 | 0.07–0.20 |
| $H_2O/YO_2$ | 20–300 | 35–60 | where Q comprises a substituted-piperidinium cation, preferably selected from those listed below and Y, W, a, b, M, and n are as defined above.

SSZ-31

Zeolite SSZ-31 is described in U.S. Pat. No. 5,106,801, issued Apr. 21, 1992 to Zones et al., which is incorporated by reference herein in its entirety. It is a zeolite having a mole ratio of an oxide selected from the group consisting of silicon oxide, germanium oxide and mixtures thereof to an oxide selected from the group consisting of aluminum oxide, gallium oxide, iron oxide and mixtures thereof greater than about 50:1. SSZ-31, as synthesized, has the X-ray diffraction (XRD) lines shown in the table below.

TABLE II

As-synthesized SSZ-31 XRD

| $2\theta^{(a)}$ | d | $I/I_2 \times 100$ |
|---|---|---|
| 6.10 | 14.49 | W |
| 7.38 | 11.98 | M |
| 8.18 | 10.81 | W |
| 20.30 | 4.37 | W |
| 21.12 | 4.21 | VS |
| 22.25 | 3.99 | VS |
| 24.73 | 3.60 | W-M |
| 30.90 | 2.89 | W |

$^{(a)}\pm 0.20$

SSZ-31 is prepared from a reaction mixture having the composition shown below.

| | Reaction Mixture | |
|---|---|---|
| | Typical | Preferred |
| $YO_2/W_aO_b$ | 30–∞ | >50 |
| OH—/$YO_2$ | 0.10–0.50 | 0.15–0.25 |
| Q/$YO_2$ | 0.15–0.50 | 0.10–0.25 |
| $M_{2/n}/YO_2$ | 0.05–0.30 | 0.05–0.15 |
| $H_2O/YO_2$ | 15–300 | 25–60 | where Q comprises a substituted-piperidinium cation, preferably selected from those listed below and Y, W, a, b, M, and n are as defined above.

SSZ-33

Zeolite SSZ-33 is described in U.S. Pat. No. 4,963,337, issued Oct. 16, 1990 to Zones, which is incorporated by reference herein in its entirety. It is a zeolite having a mole ratio of an oxide selected from boron oxide or mixtures of boron oxide with aluminum oxide, gallium oxide, iron oxide greater than about 20:1. SSZ-33, after calcination, has the X-ray diffraction (XRD) lines shown in the table below.

TABLE III

Calcined SSZ-33 XRD

| $2\theta^{(a)}$ | d | $I/I_2 \times 100$ |
|---|---|---|
| 7.81 | 11.32 | VS |
| 20.43 | 4.35 | S |
| 21.44 | 4.14 | W |
| 22.02 | 4.04 | M-S |
| 23.18 | 3.84 | M |
| 26.80 | 3.33 | M |

$^{(a)}\pm 0.20$

SSZ-33 is prepared from a reaction mixture having the composition shown below.

| Reaction Mixture | | |
|---|---|---|
| | Typical | Preferred |
| $YO_2/W_aO_b$ | 20–200 | 30–60 |
| $OH^-/YO_2$ | 0.10–1.0 | 0.20–0.30 |
| $Q/YO_2$ | 0.05–0.50 | 0.10–0.25 |
| $M_{2/n}/YO_2$ | 0.05–0.30 | 0.05–0.15 |
| $H_2O/YO_2$ | 15–300 | 25–60 | where Q comprises a substituted-piperidinium cation, preferably selected from those listed below and Y, W, a, b, M, and n are as defined above.

SSZ-35

Zeolite SSZ-35 is described in U.S. Pat. No. 5,316,753, issued May 31, 1994 to Nakagawa, which is incorporated by reference herein in its entirety. It is a zeolite having a mole ratio of an oxide selected from the group consisting of silicon oxide, germanium oxide and mixtures thereof to an oxide selected from the group consisting of aluminum oxide, gallium oxide, iron oxide, titanium oxide, boron oxide and mixtures thereof greater than about 15. SSZ-35, after calcination, has the X-ray diffraction (XRD) lines shown in the table below.

TABLE IV

| Calcined SSZ-35 XRD | | |
|---|---|---|
| $2\theta^{(a)}$ | d | $I/I_o \times 100$ |
| 8.00 | 11.04 | VS |
| 9.67 | 9.14 | W |
| 15.42 | 5.74 | W |
| 19.01 | 4.67 | W |
| 19.44 | 4.56 | W |
| 19.48 | 4.55 | W |
| 19.92 | 4.54 | W |
| 21.70 | 4.09 | W |
| 22.84 | 3.89 | W |
| 24.81 | 3.59 | W |
| 27.50 | 3.24 | W |
| 29.41 | 3.04 | W |

(a) ±0.20

SSZ-35 is prepared from a reaction mixture having the composition shown below.

| Reaction Mixture | | |
|---|---|---|
| | Typical | Preferred |
| $YO_2/W_aO_b$ | 10 or greater | 20 or greater |
| $OH^-/YO_2$ | 0.10–0.7 | 0.15–0.40 |
| $Q/YO_2$ | 0.05–0.50 | 0.05–0.40 |
| $M_{2/n}/YO_2$ | 0.01–0.50 | 0.03–0.40 |
| $H_2O/YO_2$ | 15–100 | 20–50 | where Q comprises a substituted-piperidinium cation, preferably selected from those listed below and Y, W, a, b, M, and n are as defined above.

SSZ-43

SSZ-43 is described in copending application Ser. No. 08/991,713 (now U.S. Pat. No. 5,965,104), filed on even date with this application by Nakagawa and Lee entitled "Zeolite SSZ-43", said application being incorporated by reference in its entirety herein. SSZ-43 is a zeolite having a mole ratio greater than about 50 of an oxide of a first tetravalent element to an oxide of a second tetravalent element different from said first tetravalent element, trivalent element, pentavalent element or mixture thereof and having, after calcination, the X-ray diffraction lines of Table V.

In a preferred embodiment, zeolite SSZ-43 has a mole ratio greater than about 50 of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof and having, after calcination, the X-ray diffraction lines of Table V below.

SSZ-43 is prepared from a reaction mixture having the composition shown below.

| Reaction Mixture | | |
|---|---|---|
| | Typical | Preferred |
| $YO_2/W_aO_b$ | >30 | >40 |
| $OH^-/YO_2$ | 0.15–0.30 | 0.20–0.25 |
| $Q/YO_2$ | 0.05–0.50 | 0.10–0.20 |
| $M_{2/n}/YO_2$ | 0.05–0.20 | 0.07–0.10 |
| $H_2O/YO_2$ | 20–80 | 35–45 | where Q comprises a substituted-piperidinium cation, preferably selected from those listed below and Y, W, a, b, M, and n are as defined above.

SSZ-43 as prepared has a mole ratio of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof greater than about 50; and has the X-ray diffraction lines of the table below. SSZ-43 further has a composition, as synthesized and in the anhydrous state, in terms of mole ratios, shown below.

| As-Synthesized SSZ-43 | |
|---|---|
| $YO_2/W_cO_d$ | >50 |
| $M_{2/n}/YO_2$ | 0.01–0.02 |
| $Q/YO_2$ | 0.02–0.05 | where Y, W, c, d, M and Q are as defined above.

TABLE V

| As-Synthesized SSZ-43 XRD | | |
|---|---|---|
| 2 Theta$^{(a)}$ | d | Relative Intensity$^{(b)}$ |
| 6.2 | 14.2 | W |
| 7.5 | 11.8 | M |
| 7.8 | 11.3 | M- |
| 8.1 | 10.9 | M |
| 20.95 | 4.24 | VS |
| 21.5 | 4.13 | S |
| 22.50 | 3.95 | S |
| 23.2 | 3.83 | M |

TABLE V-continued

As-Synthesized SSZ-43 XRD

| 2 Theta[a] | d | Relative Intensity[b] |
|---|---|---|
| 25.6 | 3.48 | M |
| 27.2 | 3.27 | W |

[a] ±0.15
[b] The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

After calcination, the SSZ-43 zeolites have a crystalline structure whose X-ray powder diffraction pattern include the characteristic lines shown below.

TABLE VI

Calcined SSZ-43 XRD

| 2 Theta[a] | d | Relative Intensity |
|---|---|---|
| 6.2 | 14.2 | M–S |
| 7.5 | 11.8 | W–M |
| 7.8 | 11.3 | W–M |
| 8.1 | 10.9 | W–M |
| 20.95 | 4.24 | VS |
| 21.5 | 4.13 | VS |
| 22.5 | 3.95 | S |
| 23.2 | 3.83 | M |
| 25.6 | 3.48 | W |
| 27.2 | 3.27 | W |

[a] ±0.15

The zeolites prepared by the present process are useful in hydrocarbon conversion reactions. Hydrocarbon conversion reactions are chemical and catalytic processes in which carbon-containing compounds are changed to different carbon-containing compounds. Examples of hydrocarbon conversion reactions include catalytic cracking, hydrocracking, dewaxing, alkylation, isomerization, olefin and aromatics formation reactions, and aromatics isomerization.

The following examples demonstrate, but do not limit, the present invention.

EXAMPLES

There are numerous variations on the embodiments of the present invention illustrated in the Examples which are possible in light of the teachings supporting the present invention. It is therefore understood that within the scope of the following claims, the invention may be practiced otherwise than as specifically described or exemplified.

SSZ-25

The following substituted-piperidinium cation may be used to prepare SSZ-25:

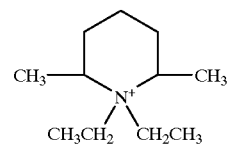

N, N-Diethyl-2,6-dimethylpiperidinium cation
(Template A1)

Example 1A

Synthesis of SSZ-25

0.30 Millimoles of Template A1 is mixed into a solution of 3 millimoles of KOH, 0.088 gram of Reheis F-2000 hydrated aluminum hydroxide and 8.6 grams of water. After mixing, the volume is 12.2 ml. 0.22 Gram of piperidine is added as additional base. 0.89 Grams of Cabosil M-5 fumed silica is blended in. The reactor is closed and mounted on a spit and tumbled inside a Blue M oven at 43 RPM. Running at 170° C., the SSZ-25 product is obtained after 10 days. Even though the Template A1 is a low concentration component in the reaction, had it been left out, the product formed from piperidine alone would have been either ferrierite or ZSM-5 or a mixture of both.

SSZ-31

The following substituted-piperidinium cations may be used to prepare SSZ-31:

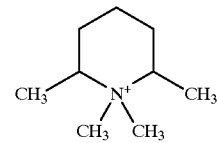

N, N-Dimethyl-2,6-dimethylpiperidinium cation
(Template B1)

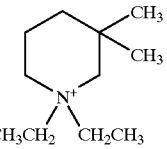

N, N-Diethyl-3,3-dimethylpiperidinium cation
(Template B2)

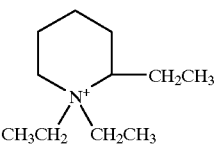

N, N-Diethyl-2-ethylpiperidinium cation
(Template B3)

-continued

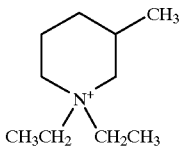

N, N-Diethyl-3-methylpiperidinium cation
(Template B4)

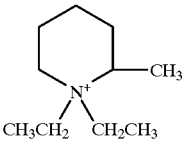

N, N-Diethyl-2-methylpiperidinium cation
(Template B5)

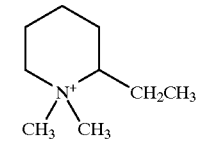

N, N-Dimethyl-2-ethylpiperidinium cation
(Template B6)

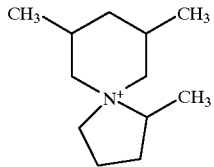

1-Methyl-7,9-dimethyl-5-azoniaspiro [4.5] decane cation
(Template B7)

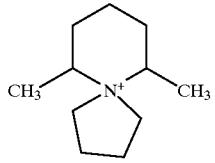

2,6-Dimethyl-1-azonia [5.4] decane cation
(Template B8)

Example 1B

Synthesis of SSZ-31

1 Millimole of Template B8 is combined with 1 millimole of KOH in 8 ml of water. 0.60 Gram of calcined boron beta zeolite, which had been previously ion-exchanged with iron cations, is added and the resulting mixture is heated for 5 days at 150° C. The resulting product, containing both B and Fe in the lattice, is zeolite SSZ-31.

Example 2B

The same experiment is repeated as in Example 1B except, the boron beta has not been Fe-exchanged and the template is now Template B7. The product is SSZ-31.

Example 3B 3.00 Millimoles of Template B3 and 0.75 millimoles of KOH are combined in 12 ml of water. 0.90 Gram of Cabosil M-5 fumed silica is added in. The reaction mixture is sealed and heated without stirring for 12 days at 160° C. The product is crystalline SSZ-31. In a like manner, Templates B1, B2 and B4–B6 can be used to make SSZ-31.

SSZ-33

The following substituted-piperidinium cation may be used to prepare SSZ-33:

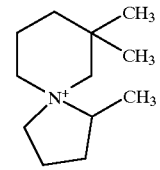

2-Methyl-9,9-dimethyl-5-azoniaspiro [4.5] decane cation
(Template C1)

Example 1C

Synthesis of SSZ-33

The reaction described in Example 1B is repeated except this time the organo-cation was Template C1, and the calcined boron beta contains no iron. The resulting product from the same experimental conditions is SSZ-33

SSZ-35

The following substituted-piperidinium cations may be used to prepare SSZ-35:

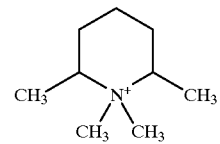

N, N-Dimethyl-2,6-dimethylpiperidinium cation
(Template D1)

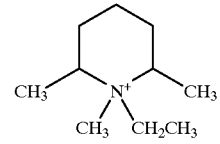

N-Ethyl-N-methyl-2,6-dimethylpiperidinium cation
(Template D2)

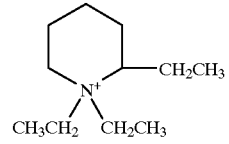

N, N-Diethyl-2-ethylpiperidinium cation
(Template D3)

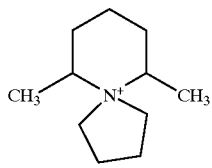

2,6-Dimethyl-1-azonia [5.4] decane cation
(Template D4)

Example 1D

Synthesis of SSZ-35

2.25 Millimoles of Template D2 is combined with 2.25 millimoles of NaOH in a total volume of 12 ml. 0.06 Grams of sodium tetraborate decahydrate (about 0.3 millimoles of $B_2O_3$) is dissolved into this solution. Cabosil M-5 fumed silica, 0.90 gram, is slurried in last. The reactor is closed, mounted on a spit and tumbled inside a Blue M oven at 43 RPM. At 12 days at 160° C., the reaction is judged to have produced a product, which by XRD analysis, is determined to be highly crystalline SSZ-35.

Examples 2D–4D

Synthesis of SSZ-35

In a manner similar to that described in Example 1D, Templates D1, D3 and D4 are used to synthesize zeolite SSZ-35.

SSZ-43

The following substituted-piperidinium cations may be used to prepare SSZ-43:

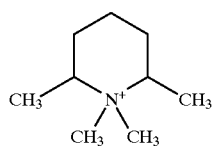

N, N-Dimethyl-2,6-dimethylpiperidinium cation
(Template E1)

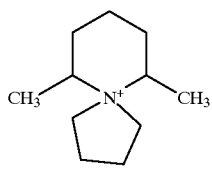

2,6-Dimethyl-1-azoniaspiro [5.4] decane cation
(Template E2)

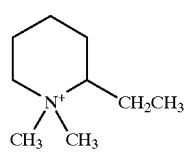

N, N-Dimethyl-2-ethylpiperidinium cation
(Template E3)

Example 1E

Synthesis of N,N-dimethyl-cis-2,6-dimethylpiperidinium hydroxide (Template E1)

Thirty-six grams of cis-2,6-dimethylpiperidine is mixed with 320 ml of methanol and 64 grams of potassium bicarbonate. Methyl iodide (199 grams) is added dropwise to the reaction mixture and, following complete addition, the reaction mixture is heated at reflux for three days. Following isolation of the desired product, the salt is recrystallized from hot acetone and ether with a small amount of methanol and the iodide salt is converted to the hydroxide salt by treatment with Bio-Rad AG1-X8 anion exchange resin. The hydroxide ion concentration is determined by titration of the resulting solution using phenolphthalein as the indicator.

Example 2E 1.5 Milliliters of Template E1 and 0.50 gram of 1N NaOH are combined to make a solution. Calcined boron beta zeolite (0.60 gram) is added to the solution as a source of both Si and B. The reaction is heated at 150° C. for four days without stirring. The product is zeolite SSZ-43. The X-ray diffraction data for the product is given below.

| As-synthesized SSZ-43 | | |
|---|---|---|
| 2 Theta | d | $I/I_2 \times 100$ |
| 6.20 | 14.25 | 18 |
| 7.44 | 11.87 | 20 |
| 7.79 | 11.34 | 20 |
| 8.09 | 10.92 | 22 |
| 12.19 | 7.25 | 9 |
| 13.00 | 6.81 | 5 |
| 15.62 | 5.67 | 2 |
| 18.14 | 4.89 | 6 |
| 19.46 | 4.56 | 17 |
| 21.03 | 4.22 | 100 |
| 21.51 | 4.13 | 67 |
| 21.68 | 4.10 | 59 |
| 22.54 | 3.94 | 62 |
| 23.16 | 3.84 | 32 |
| 25.04 | 3.55 | 8 |
| 25.62 | 3.48 | 21 |
| 27.21 | 3.28 | 18 |
| 28.04 | 3.18 | 4 |
| 29.04 | 3.07 | 4 |
| 30.36 | 2.94 | 3 |
| 31.05 | 2.88 | 6 |
| 35.00 | 2.56 | 3 |
| 35.89 | 2.50 | 5 |
| 36.56 | 2.46 | 2 |
| 37.15 | 2.42 | 12 |
| 38.46 | 2.34 | 3 |

Example 3E

The reaction of Example 2E is repeated, except that the template is Template E2. The product is SSZ-43.

Example 4E

Example 2E is repeated using Template E3. The product after 12 days is SSZ-43.

Example 5E

Calcination of SSZ-43

The material from Example 2E is calcined in the following manner. A thin bed of material is heated in a muffle furnace from room temperature to 120° C. at a rate of 1° C. per minute and held at 120° C. for three hours. The temperature is then ramped up to 540° C. at the same rate and held at this temperature for 5 hours, after which it is increased to 594° C. and held there for another 5 hours. A 50/50 mixture of air and nitrogen is passed over the zeolite at a rate of 20 standard cubic feet per minute during heating.

Example 6E

Calcination of B-SSZ-43

The procedure described in Example 5E is followed with the exception that the calcination is performed under a nitrogen atmosphere. The product of Example 2E is used It has a $SiO_2/B_2O_3$ mole ratio of 75. The X-ray diffraction data for this product is provided below.

Calcined SSZ-43

| 2 Theta | d | $I/I_2 \times 100$ |
|---|---|---|
| 6.19 | 14.26 | 50 |
| 7.47 | 11.83 | 36 |
| 7.78 | 11.36 | 37 |
| 8.07 | 10.94 | 41 |
| 9.40 | 9.40 | 5 |
| 14.67 | 6.03 | 9 |
| 15.69 | 5.64 | 6 |
| 19.43 | 4.57 | 17 |
| 20.89 | 4.25 | 100 |
| 21.45 | 4.14 | 44 |
| 21.68 | 4.10 | 32 |
| 22.56 | 3.94 | 41 |
| 23.17 | 3.84 | 20 |
| 25.00 | 3.56 | 10 |
| 25.60 | 3.48 | 21 |
| 27.21 | 3.28 | 13 |
| 29.08 | 3.07 | 2 |
| 30.17 | 2.96 | 3 |
| 30.94 | 2.89 | 6 |
| 32.42 | 2.76 | 3 |
| 34.85 | 2.57 | 3 |
| 35.86 | 2.50 | 5 |
| 36.61 | 2.45 | 4 |
| 36.96 | 2.43 | 10 |

Example 7E

$N_2$ Micropore Volume

The product of Example 5E is subjected to a micropore volume analysis using $N_2$ as adsorbate and via the BET method. The micropore volume is 0.065 cc/g, thus exhibiting considerable void volume.

What is claimed is:

1. A process for preparing zeolites having 12-ring pores and having at least one internal pore structure with a cross section measuring greater than 7.5 Å, the process comprising:

(a) preparing an aqueous solution from (1) sources of an alkali metal oxide, alkaline earth metal oxide or mixtures thereof; (2) sources of an oxide of a first tetravalent element or mixture of tetravalent elements; (3) sources of an oxide of a second tetravalent element different from the first tetravalent element(s), trivalent element, pentavalent element or mixture thereof; and (4) at least one organic templating agent comprising a substituted-piperidinium cation of the formula:

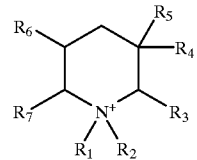

where $R_1$ and $R_2$ are each lower alkyl or together with the nitrogen atom form a five or six member spiro ring which may be substituted with at least one lower alkyl group, $R_3$, $R_4$, $R_5$, $R_6$ and $R_7$ are each independently lower alkyl or hydrogen with the proviso that at least one is lower alkyl; and (b) maintaining the aqueous solution under conditions sufficient to form crystals of the zeolite.

2. The process of claim 1 wherein said aqueous solution comprises, in terms of mole ratios, the following:

| | |
|---|---|
| $YO_2/W_aO_b$ | 10–∞ |
| $OH^-/YO_2$ | 0.10–1.0 |
| $Q/YO_2$ | 0.05–0.50 |
| $M_{2/n}/YO_2$ | 0.05–0.50 |
| $H_2O/YO_2$ | 15–30 | wherein Y is silicon, germanium or a mixture thereof; W is aluminum, gallium, iron, boron, titanium, indium, vanadium or mixtures thereof; a is 1 or 2, and b is 2 when a is 1 and b is 3 when a is 2; M is an alkali metal cation, alkaline earth metal cation or mixtures thereof; n is the valence of M; and Q is at least one substituted-piperidinium cation.

3. The process of claim 2 wherein said aqueous solution comprises, in terms of mole ratios, the following:

| | |
|---|---|
| $YO_2/W_aO_b$ | 20 or greater |
| $OH^-/YO_2$ | 0.05–0.50 |
| $Q/YO_2$ | 0.05–0.40 |
| $M_{2/n}/YO_2$ | 0.05–0.40 |
| $H_2O/YO_2$ | 20–60 |

4. The process of claim 1 wherein the substituted-piperidinium cation is selected from the following:

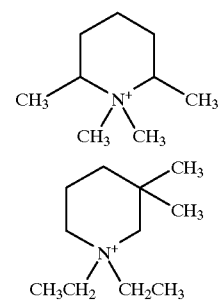

-continued

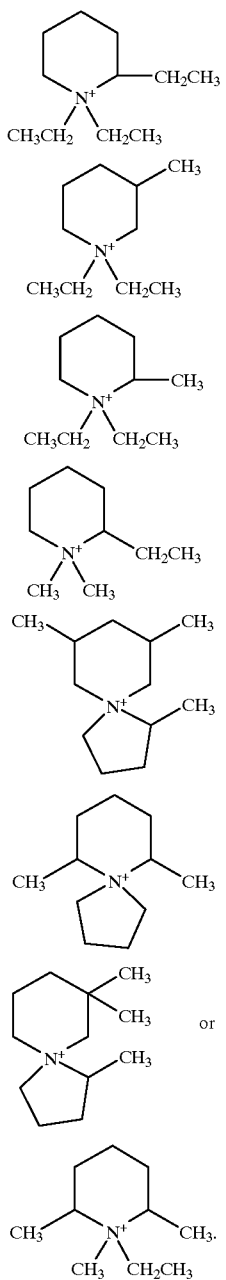

5. The process of claim 1 wherein the zeolite is SSZ-25, SSZ-31, or SSZ-33.

6. The process of claim 5 wherein the zeolite is SSZ-25 and the substituted-piperidinium cation has the following structure:

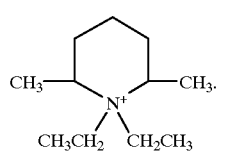

7. The process of claim 5 wherein the zeolite is SSZ-31 and the substituted-piperidinium cation has the following structure:

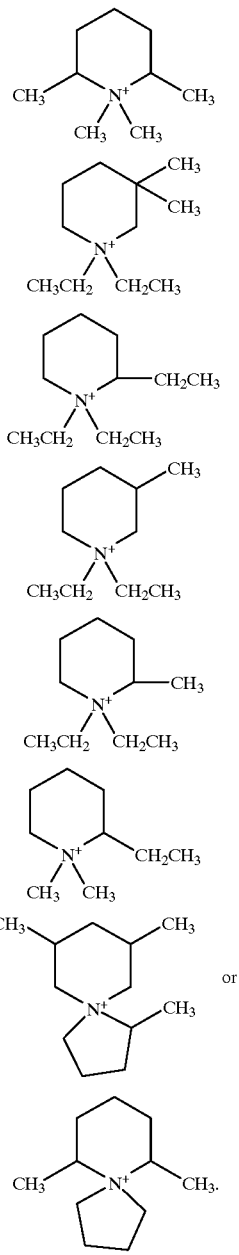

8. The process of claim 5 wherein the zeolite is SSZ-33 and the substituted-piperidinium cation has the following structure:

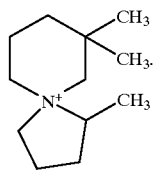

9. The process of claim 1 further comprising replacing the alkali metal cations, alkaline earth metal cations, or both of the zeolite, at least in part, by ion exchange with a cation or mixture of cations selected from the group consisting of hydrogen and hydrogen precursors, rare earth metals, and metals from Groups IIA, IIIA, IVA. IB, IIB, IIIB, IVB, VIB, and VIII of the Periodic Table of Elements.

10. The process of claim 9 wherein said replacing cation is hydrogen or a hydrogen precursor.

11. A zeolite having 12-ring pores and having at least one internal pore structure with a cross section measuring greater than 7.5 Å, as-synthesized and in the anhydrous state, whose general formula, in terms of mole ratios, is as follows:

| | |
|---|---|
| $YO_2/W_cO_d$ | >15 |
| $Q/YO_2$ | 0.01–0.03 |
| $M_{2/n}/YO_2$ | 0.01–0.04 | wherein Y is silicon, germanium or a mixture thereof; W is aluminum, gallium, iron, boron, titanium, indium, vanadium or mixtures thereof; c is 1 or 2; d is 2 when c is 1 or d is 3 or 5 when c is 2; M is an alkali metal cation, alkaline earth metal cation or mixtures thereof; n is the valence of M; and Q is at least one substituted-piperidinium cation of the formula:

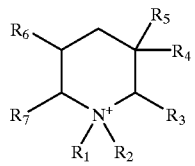

where $R_1$ and $R_2$ are each lower alkyl or together with the nitrogen atom form a five or six member spiro ring which may be substituted with at least one lower alkyl group, $R_3$, $R_4$, $R_5$, $R_6$ and $R_7$ are each independently lower alkyl or hydrogen with the proviso that at least one is lower alkyl.

12. The zeolite of claim 11 wherein the substituted-piperidinium cation is selected from the following:

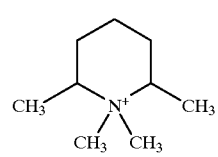

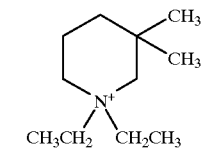

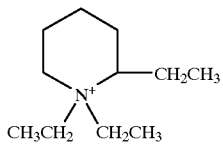

-continued

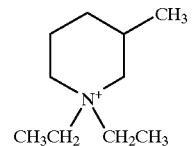

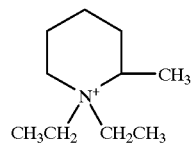

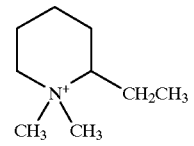

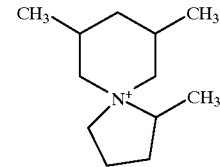

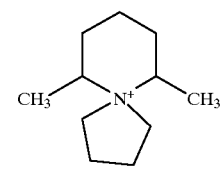

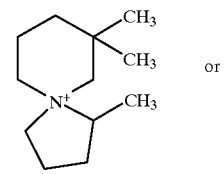

or

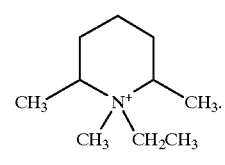

13. The zeolite of claim 11 wherein the zeolite is SSZ-25, SSZ-31, or SSZ-33.

14. The zeolite of claim 13 wherein the zeolite is SSZ-25 and the substituted-piperidinium cation has the following structure:

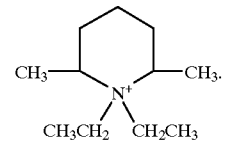

15. The zeolite of claim 13 wherein the zeolite is SSZ-31 and the substituted-piperidinium cation has the following structure:

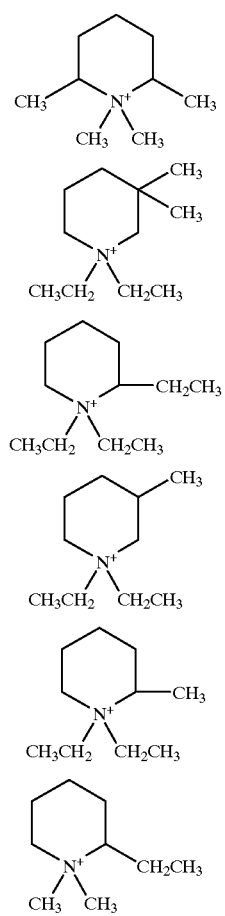
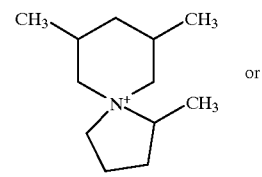
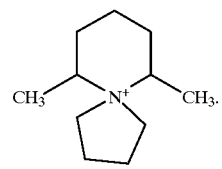
16. The of claim 13 wherein the zeolite is SSZ-33 and the substituted-piperidinium cation has the following structure:
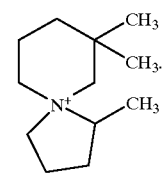
* * * * *